(12) United States Patent  (10) Patent No.: US 8,775,923 B1
Kroeger et al.  (45) Date of Patent: Jul. 8, 2014

(54) WEB PAGE RESTORATION

(75) Inventors: Robert Kroeger, Kitchener (CA);
Richard Byers, Waterloo (CA)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 13/245,749

(22) Filed: Sep. 26, 2011

(51) Int. Cl.
*G06F 17/00* (2006.01)

(52) U.S. Cl.
USPC .......................................... 715/234; 715/200

(58) Field of Classification Search
USPC ................................................ 715/234, 200
See application file for complete search history.

(56) References Cited

U.S. PATENT DOCUMENTS

| | | | | |
|---|---|---|---|---|
| 6,433,794 B1 * | 8/2002 | Beadle et al. | ................. | 715/700 |
| 6,434,575 B1 * | 8/2002 | Berry et al. | ........................... | 1/1 |
| 7,502,843 B2 * | 3/2009 | Kirstein et al. | ............... | 709/223 |
| 7,712,025 B2 | 5/2010 | Roessler | | |
| 7,805,523 B2 * | 9/2010 | Mitchell et al. | ............... | 709/228 |
| 7,962,547 B2 * | 6/2011 | Kern et al. | ..................... | 709/203 |
| 2006/0031479 A1 * | 2/2006 | Rode | ............................. | 709/224 |
| 2007/0150556 A1 * | 6/2007 | Fukuda et al. | ................. | 709/219 |
| 2007/0300145 A1 * | 12/2007 | Perelman et al. | ............. | 715/505 |
| 2008/0120257 A1 * | 5/2008 | Goyal et al. | ..................... | 706/12 |

OTHER PUBLICATIONS

Harry Parsonage, "Web Browser Session Restore Forensics—A valuable record of a user's internet activity for computer forensic examinations," hp, Jan. 2010, pp. 1-11.
The Mozilla Blog, "Your Firefox in the Cloud: Firefox Sync and Firefox Home," Jun. 26, 2010, log.mozilla.com/.../your-firefox-in-the-cloud-firefox-sync-and-firefox-home/, 5 pages.

* cited by examiner

*Primary Examiner* — Manglesh M Patel
(74) *Attorney, Agent, or Firm* — McDermott Will & Emery LLP

(57) ABSTRACT

Methods and systems for web page restoration are provided. A method for restoring web pages includes identifying a root node of a node graph, wherein each node of the node graph represents an object of a plurality of objects that form a last state of a web page, including DOM objects. The method also includes traversing the node graph to a next frontier node and determining an object identifier of the next frontier node. The method further includes storing the object identifier and associated properties into a queue of objects when the object identifier of the next frontier node is not found in the queue of objects. The queue of objects may be used to restore objects with object properties having values according to the last state of the web page. Scripting language objects may also be stored for later restoration.

30 Claims, 7 Drawing Sheets

WEB PAGE RESTORATION

TECHNICAL FIELD

The embodiments relate generally to web page applications on computing devices.

BACKGROUND

Web pages viewed in a web browser may be closed voluntarily or involuntarily. Browser users often desire to return to the most recent state of a web page before it was closed or crashed. Though a user may reload the web page previously visited, a more complete restoration of the web page may be required. For example, a web browser is restarted and previously opened pages are re-opened. However, the state of the page is lost (e.g., filled in field values, state/position of any active objects on the page), making the restart noticeable to the user and potentially painful. The user may have entered some information into the web page and worked with scripting language objects on the web page. If the user wishes to work on this same state of the web page, the user will load the web page, but the form entries and progress within the scripting language object he or she was working in will have been lost. The user will have to painstakingly reenter any form information or reexecute and proceed to the last point in scripting language objects, in order to restore the web page to its last state. This may result in loss of productivity and user frustration.

BRIEF SUMMARY

Methods and systems for restoring web pages are disclosed. According to an embodiment, a method for restoring web pages includes identifying a root node of a node graph, wherein each node of the node graph represents an object of a plurality of objects that form a last state of a web page and the plurality of objects includes at least one document object model (DOM) object. The method also includes traversing the node graph to a next frontier node and determining an object identifier of the next frontier node. The method further includes storing the object identifier and object properties associated with the object identified by the object identifier into a queue of objects when the object identifier of the next frontier node is not found in the queue of objects. The queue of objects may be used to restore objects with object properties having values according to the last state of the web page. Scripting language objects may also be stored for later restoration.

According to another embodiment, a system for restoring web pages includes an object queue builder configured to store the object identifier and object properties associated with the object identified by the object identifier into a queue of objects when the object identifier of the next frontier node is not found in the queue of objects. The queue of objects may be used to restore objects with object properties having values according to the last state of the web page.

According to another embodiment, a method for restoring web pages includes receiving an object identifier for each object of a plurality of objects that form a last state of a web page rendered on a first computing device. The plurality of objects includes at least one scripting language object that refers to a DOM object and at least one DOM object with a scripting language function attached as an event handler. The method also includes receiving properties associated with each object identified by an object identifier. The method further includes restoring a web page to the last state on a second computing device using received properties associated with each received object identifier, wherein the restoring includes restoring event handlers for received DOM objects and scripting language functions with corresponding values according to the last state of the web page.

According to another embodiment, a system for restoring web pages includes an object identifier receiver configured to receive an object identifier for each object of a plurality of objects that form a last state of a web page rendered on a first computing device, wherein the plurality of objects includes at least one scripting language object that refers to a DOM object and at least one DOM object with a scripting language function attached as an event handler. The system also includes an associated properties receiver configured to receive properties associated with each object identified by an object identifier. The system further includes a web page restorer, implemented by the same device or a second computing device, configured to restore a web page to the last state using the received properties associated with each received object identifier. This may include restoring event handlers for received DOM objects and scripting language functions with corresponding values according to the last state of the web page.

According to a further embodiment, a computer readable storage medium has control logic stored therein that, when executed by a process, causes the processor to provide for web page restoration. The control logic includes a first computer readable program code to cause the processor to identify a root node of a node graph, wherein each node of the node graph represents an object of a plurality of objects that form a last state of a web page, wherein the plurality of objects includes at least one DOM object, traverse the node graph to a next frontier node, and determine an object identifier of the next frontier node. The control logic may also include a second computer readable program code to cause the processor to store the object identifier and object properties associated with the object identified by the object identifier into a queue of objects when the object identifier of the next frontier node is not found in the queue of objects, whereby the queue of objects may be used to restore objects with object properties having values according to the last state of the web page.

Other embodiments of this aspect include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
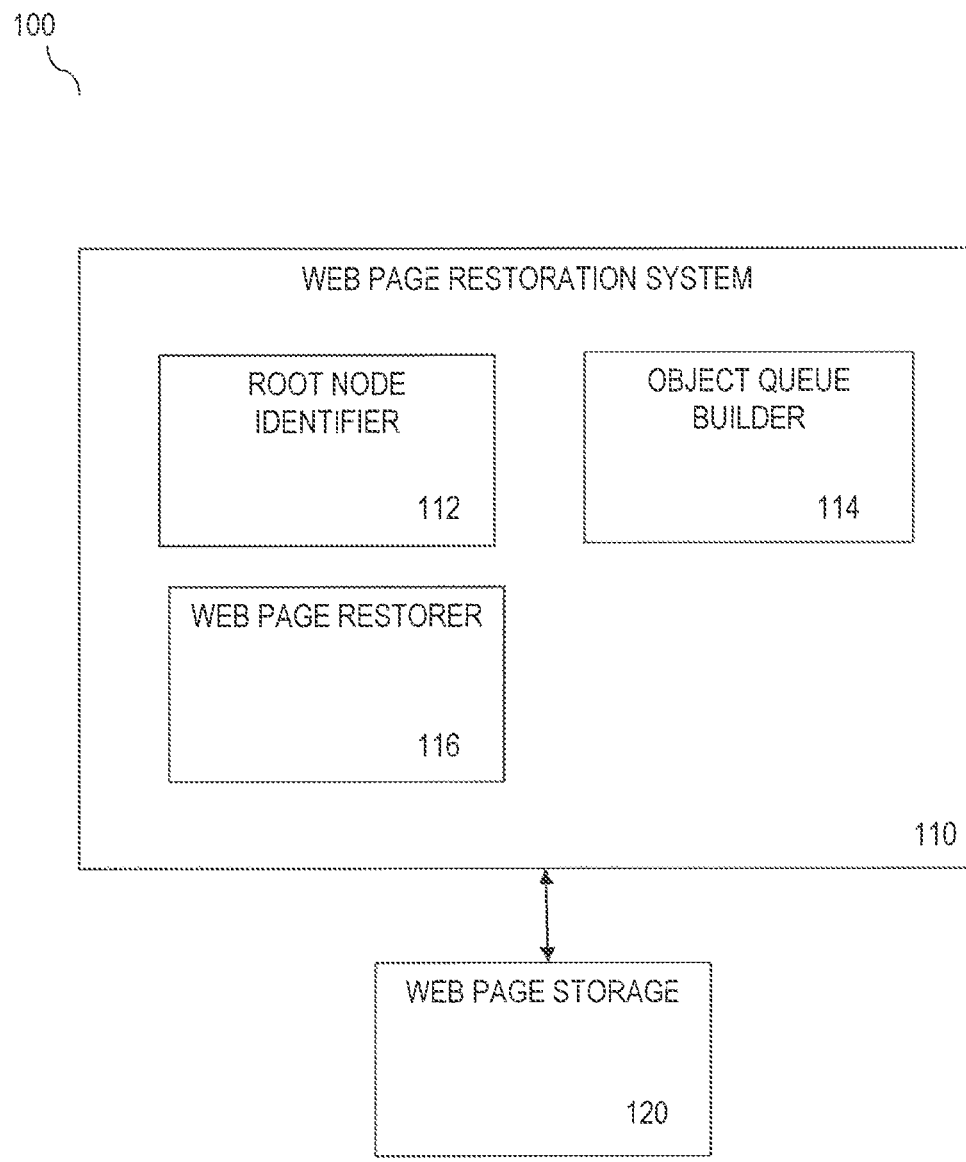
FIG. 1 illustrates a system for web page restoration, according to an embodiment.

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

There are many circumstances when a more thorough web page restoration is desired. For example, a web browser is restarted (either forcefully for an update, or by the choice of the user) and previously opened pages are re-opened. But the state of the page is lost (e.g., filled in field values, state/position of any active objects on the page), making the restart noticeable to the user and potentially painful. In another example, a web browser (e.g., running on a memory constrained device like a phone) determines it needs to reclaim some memory. As a result, it purges some information about tabs not recently used. When the user switches back to these tabs, the browser is forced to reload the web page, losing the current state of the page. In another example, a user encounters a problem with a web page not functioning properly and reports the issue to technical support. The support team asks for a detailed description of how the web page got into the dysfunctional state so that they can reproduce the problem, but the user cannot remember or fully reproduce the issue.

Note that these problems may be relatively minor for simple web pages with little interactivity, but as the web moves to more complex web applications (games, interactive editing, etc.) it becomes a much more important and challenging problem.

Current solutions for retaining web page information are insufficient. Web pages may be saved by taking a snapshot of a current visible state of a web page and saving it as a new HTML file (as implemented, for example, by a 'Save As' feature). However, this saves only the DOM state and so the restored page does not have the same interactive scripting language state. Computer hibernation, or saving machine state to disk so that it can be powered down, is limited to a very course grained state (whole operating system). It also cannot be copied from one device to another.

Process swapping and paging, or saving the state of an OS process to disk and allowing it to be swapped back in later, relies on some state (e.g., open files and other kernel data structures) remaining in memory in the operating system, or (if also paged out) at least being coupled to such a state. Process memory dumps and error-reporting, when encountering an unexpected error, writes out part or all of the memory of the process to a "dump" file on disk and then uploads that file to a server along with details of the process and error. Such dumps, however, do not include sufficient information to completely restore the process. For example, they are missing operating system states.

There are two forms of state on a web page: the DOM (visible elements) and scripting language code, such as JavaScript™ code. These two forms typically refer to each other and must be persisted together. Scripting language objects generally refer to DOM objects, and DOM objects sometimes having scripting functions attached as event handlers. Scripting languages can add any number of additional variables to any DOM element. These properties may be referred to as "expando" properties. Scripting language state can be further divided into the heap (all objects currently reachable by any code) and the stack (what code is currently running and the local variables available to it.) DOM objects and scripting language objects may be stored in a manner to provide a more thorough web page restoration.

FIG. 1 illustrates an example system 100 for web page restoration, according to an embodiment. System 100 includes web page restoration system 110 and web page storage 120. System 100 may be implemented on or implemented with one or more computing devices. Web page restoration system 110 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Web page restoration system 110 may be coupled to or include web page storage 120, according to an embodiment. Web page storage 120 may be a local database or any other data structure stored in a memory. The local database may contain information related to web pages, such as Uniform Resource Locator (URL) and bookmark information. This information may be updated by a remote server related to a web browser application on the same device as web page restoration system 110.

According to an embodiment, web page restoration system 110 includes root node identifier 112, object queue builder 114 and web page restorer 116. In some cases, web page restoration system 110 may include an object identifier generator.

Object queue builder 114 may be configured to store an object identifier for each object of a plurality of objects that form a last state of a web page, according to an embodiment. The plurality of objects may include at least one scripting language object that refers to a document object model (DOM) object. The plurality of objects may also include at least one DOM object with a scripting language function attached as an event handler.

In some cases, a DOM may be a tree-like data structure of nodes. Web content may be parsed into these nodes. A parallel render tree is built from the DOM where there is a render box for every drawn node in the DOM. A third parallel tree, or layer tree, has render layers for some DOM nodes. Each render box has an associated layer. Render layers group render boxes so that paint happens in two stages. First render boxes comprising the layer are painted into an image. Second, the images are formed into a composite image.

To persist, for example, a JavaScript™ heap and DOM tree, each object is given a unique identifier (e.g., its address in memory). A queue of objects, or pointers to the objects, is formed and this queue of objects will be stored. Objects have fields with values. Objects are stored by storing all details or properties about them. In some case, the queue may be created starting with the "roots" of the garbage-collected (GC) heap.

According to an embodiment, root node identifier 112 may be configured to identify a root node of a node graph, wherein each node of the node graph represents an object of a plurality of objects that form a last state of a web page. The plurality of objects includes at least one DOM object. The root node identifier is further configured to traverse the node graph to a next frontier node and determine an object identifier of the next frontier node.

Object queue builder 114 is configured to store the object identifier and object properties associated with the object identified by the object identifier into a queue of objects when the object identifier of the next frontier node is not found in the queue of objects. The queue of objects may be used to restore objects with object properties having values according to the last state of the web page.

Each object is persisted by storing its identifier along with its properties based on their type. Example types may include primitive values (numbers, strings, etc.) that are written out in any efficient encoding and object/DOM references that are referenced by their unique identifier. If it has not already been saved, it is pushed onto the queue. Other types may include scripting language functions that are written out in any convenient binary form (e.g., its byte-code), and scripting language closures writing a reference to a function (by its identifier) and a list of name/value pairs for the environment. Every DOM object also persists all event handlers attached to it with the name of the event and references to each closure object. Object queue builder 114 may be configured to store properties associated with each object identified by an object identifier. Scripting language functions, closures and DOM event handlers may be serialized.

Objects may also include scripting language closures that references a functions and lists of name-value pairs for an environment of the function. Objects may include encoded primitive values or objects of a scripting language heap for the web page. Code of a scripting language stack for the web page may be stored and the associated properties may include local variables available to the code. Other associated properties of an object may include properties of at least one scripting language function written in binary form or byte-code form.

Since web pages are typically designed to be single-threaded with user interface updates occurring on the same thread as any scripting language computation, no scripting language stack should be active for very long. Therefore, when persisting the state of a page, it may be sufficient, in some cases, to wait a short period (typically <1 second) for any active scripting language event handlers to complete and return to the top-level message pump so that there is no scripting language stack state to persist.

The queue may be processed an object at a time. Objects may be stored using processes such as serializing. Serializing gets essential structure of data independent of a process. Serializing a page may include capturing different properties of a web page. This may include the scripting language heap and the DOM as currently constructed. This may also include properties computed and dispatched into the render tree. In particular, these properties may be positions of objects (CSS transforms) and temporal offsets for parametric functions (CSS animation).

Layers can have a transform (in the 2D/3D geometry sense) set via JavaScript/CSS animation that is not a property of the DOM element that sets its position with respect to its parent. Transforms may be added a DOM by extracting the interior state of a DOM element's associated layer and setting it on the element. Thus layers can be ignored while serializing.

Serialization may include many important tasks. An embodiment of serialization is described here. Any scripting languages in progress, such as JavaScript, are finished running. All timers are suspended and animations called back. CSS animation is suspended. Any deferred layout is finalized so that the render tree is up to date. Garbage collection of the scripting language heap is made through the full generational suite. The remaining scripting language global objects list forms the starting root set.

Transient rendering-related visual properties may be stored to DOM elements as temporary attributes. For each render box in the render tree that has an associated layer, if the layer has a non-identity transform, the DOM element is decorated with an expando property containing the transform. If the layer is participating in an in-progress CSS animation, compute a relative parametric time and push this to the associated DOM element as an expando property. The render and layer tree are then deleted. The scripting language global object list is unioned with the document to form the starting root list.

The tree may be walked using a standard mark-sweep algorithm. The results may be written out. According to an embodiment, a queue may be formed by traversing a graph of the objects without returning to the same node. A graph may include nodes, addresses and numerical values. When building a queue, it can be determined which nodes are on the frontier of the graph and these nodes can be queued. When the process arrives at a node, an object identifier is determined. The process may determine which nodes are already serialized. This queue building may apply to scripting language states and DOM states.

According to an embodiment, web page restorer 116 may be configured to restore a web page to the last state using the stored properties associated with each stored object identifier, including restoring event handlers for stored DOM objects and scripting language functions with corresponding values according to the last state of the web page. A state of a web page may be restored from its persisted form by processing the stored object queue. This may involve following the inverse algorithm of serialization.

Deserialization may include building up a map of object identifiers. Objects may be restored in the same order of serialization. This may allow for definitions to be set up first. However, if an object, or object property, is referred to but not yet defined, the object may be formed when the definition is available. Nodes may be developed and connections between nodes may be formed. Reconstitution may be performed statefully. Web applications may be restored to the same state as recorded or found in a browser history. If the queue is stored locally, no network connection to a web server is necessary to reproduce the web page and the state of the web page.

According to an embodiment, deserialization includes reconstituting a scripting language heap and DOM tree. A tentative render tree may be rebuilt. Temporary expando properties are pushed into the render tree. The expando properties are deleted. Scripting language timers are restarted. CSS animation is also restarted.

Serialization may be resource expensive. Serialization may be performed at certain time intervals based on user settings or resource metrics. In other cases, serialization may be performed upon save, close or remove functions. Other factors may affect the frequency of serialization, including when network connections are formed or maintained.

In some cases, object identifiers may be available. For example, object identifiers may be the memory addresses of the objects. In other cases, an object identifier generator may be configured to generate a unique identifier for each object.

Some canvas/WebGL issues may be addressed. In some cases, a browser may send remote procedure call (rpc) streams via a transfer buffer to the browser to render. Command buffer windows for graphics container tags may be stored. Tags may define a rectangular drawing region in which drawing commands are immediately rendered to the screen. In particular, WegGL or canvas tags are examples in current use. A command stream may be modified to preserve a temporal window of commands comprising the previous displayed frame. The most recently issued commands sufficient to generate visible contents of an immediate drawing mode tag may be stored. The command list for the previous frame (i.e., on-screen frame) may be stored. Upon deserialization, the command buffer may be repopulated and redrawn after expando properties are deleted.

Figure 2:
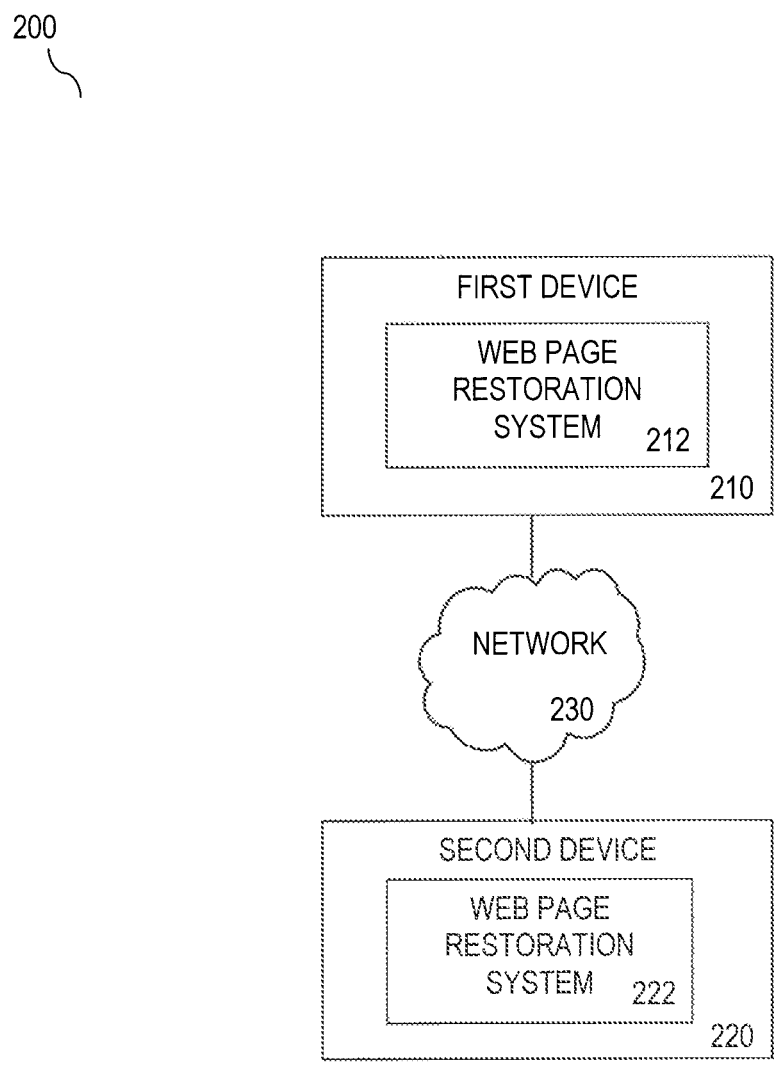
FIG. 2 illustrates another system for web page restoration with multiple devices, according to an embodiment.

FIG. 2 shows an example system 200 of web page restoration, according to an embodiment. First device 210 may communicate with second device 220 over network 230. First device 210 includes web page restoration system 212. Second device 220 includes web page restoration system 222. Web page restoration system 212 (or 222) may be comparable to web page restoration system 110 shown in FIG. 1. Objects of a web page state may be serialized by one device and used to restore a web page state on another device.

Figure 3:
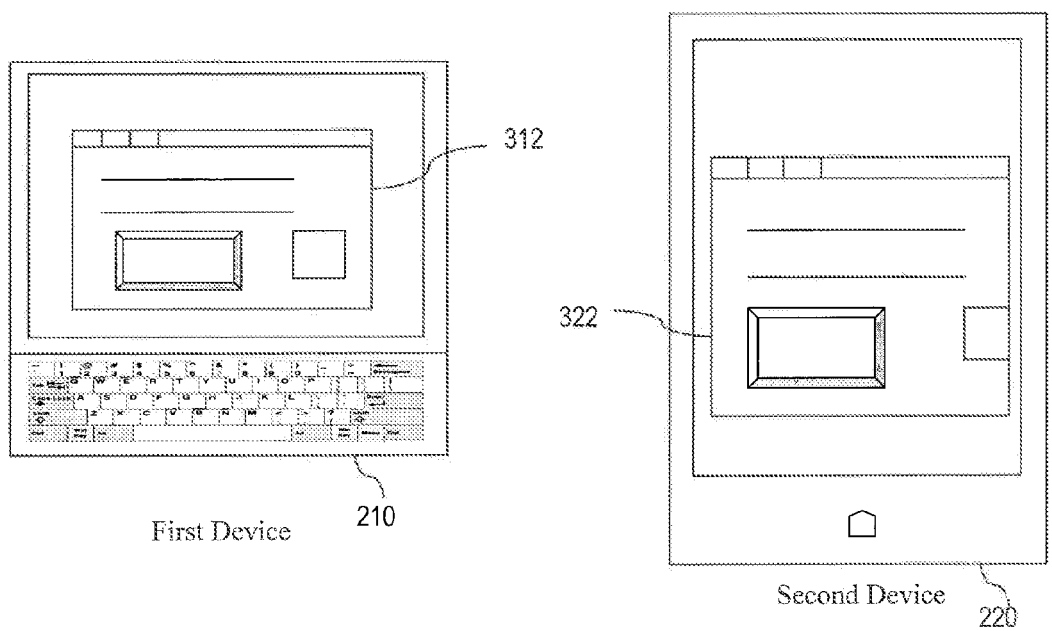
FIG. 3 is an example implementation of the system of FIG. 2.

For example, FIG. 3 shows first device 210 with web page state 312. Web page restoration system 212 stores object identifiers and properties of web page state 312, including for DOM objects and scripting language objects. These object identifiers and properties may be used to restore web page state 312 on first device 210. They may also be transmitted to second device 220 and used to restore web page state 312 as web page state 322 on second device 220.

Figure 4:
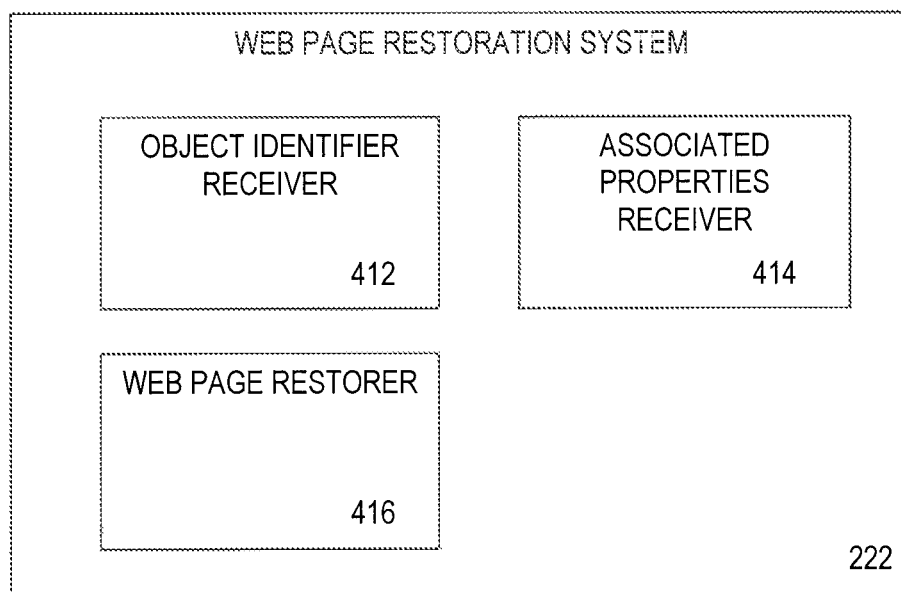
FIG. 4 illustrates an example web page restoration system for the system shown in FIG. 2.

FIG. 4 illustrates an example system 400 of web page restoration involving multiple devices, such as in the embodiment illustrated by FIG. 3. System 400 includes web page restoration system 222 and web page storage 420. Web page storage 420 may be a local database or any other data structure stored in physical memory. System 400 may be implemented on or implemented with a computing device. For example, web page restoration system 222 may be software, firmware, or hardware or any combination thereof in a computing device.

According to an embodiment, web page restoration system 222 includes object identifier receiver 412, associated properties receiver 414 and web page restorer 416. As in the example of FIG. 3, second device 220 receives object identifiers and properties for web page restoration. In this case, object identifier receiver 412 and associated properties receiver 414 are configured to receive, respectively, the object identifiers and properties from another device or server. In some cases, both receiving functions may be performed by either object identifier receiver 412 or associated properties receiver 414. Web page restorer 416 restores web page state 312 as web page state 322 on second device 220. This may include deserializing an object queue, as discussed above.

Figure 5:
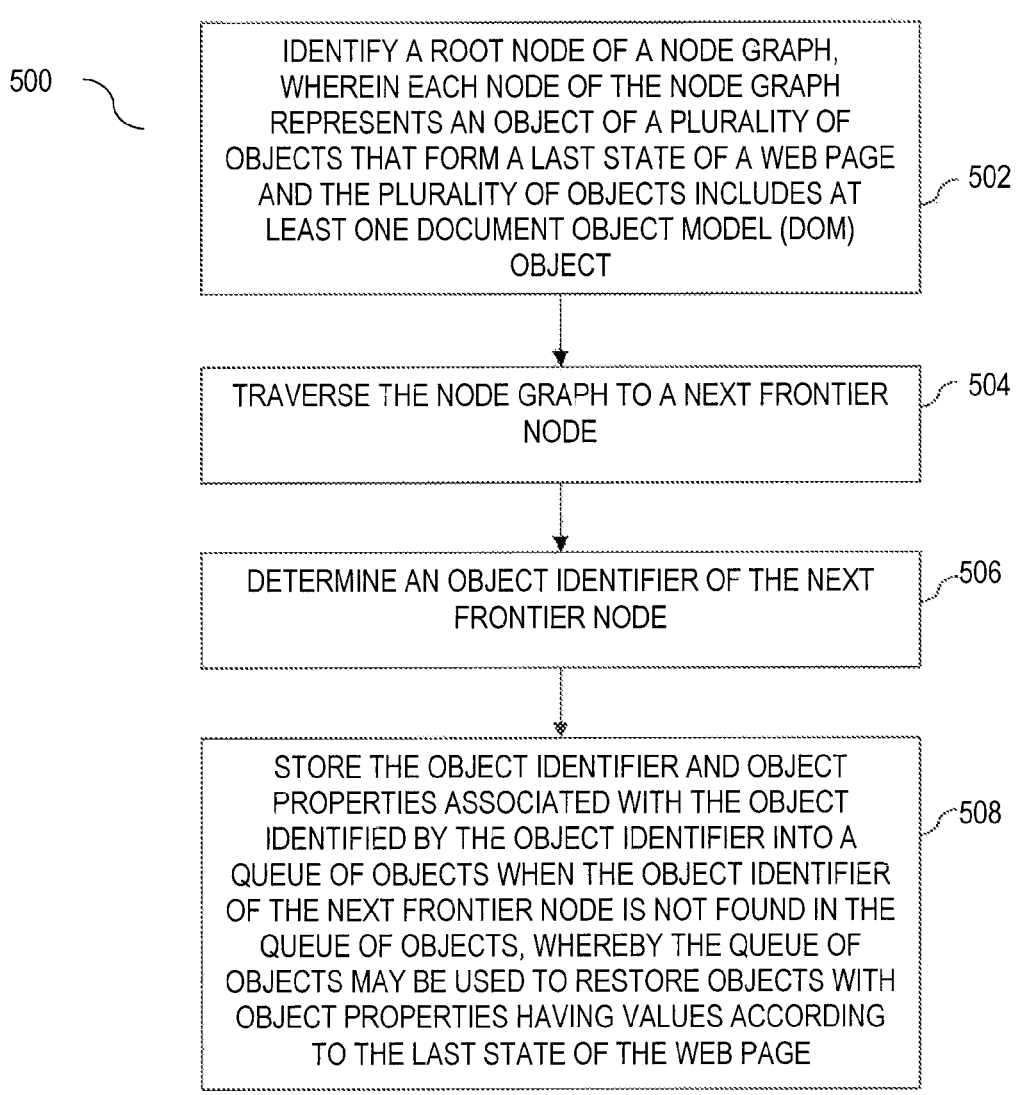
FIG. 5 illustrates a method for web page restoration, according to an embodiment.

FIG. 5 is a flowchart illustrating an example method 500 for web page restoration, according to an embodiment. This may involve identifying objects to store. At step 502, a root node of a node graph is identified. Each node of the node graph represents an object of a plurality of objects that form a last state of a web page and the plurality of objects includes at least one DOM object.

According to an embodiment, root node identifier 112 may be used to traverse a node graph and identify objects for storage. At step 504, the node graph may be traversed to a next frontier node. At 506, an object identifier of the next frontier node is identified.

At step 508, the object identifier and object properties associated with the object identified by the object identifier are stored into a queue of objects when the object identifier of the next frontier node is not found in the queue of objects. This queue of objects is used to restore objects with object properties having values according to the last state of the web page. Object queue builder 114 is used to perform this step. In some embodiments, web page storage 120 or web page storage 420 may be used to store object identifiers and properties.

Web page restorer 116 may be use the stored object queue to restore the last state of the web page using the stored properties associated with each stored object identifier. The restoring may include restoring event handlers for stored DOM objects and scripting language functions with corresponding values according to the last state of the web page. The web page may be restored with the associated properties to accurately represent the web page in its most recent state. The web page may be restored on the same device. The web page may also be restored on another device.

Figure 6:
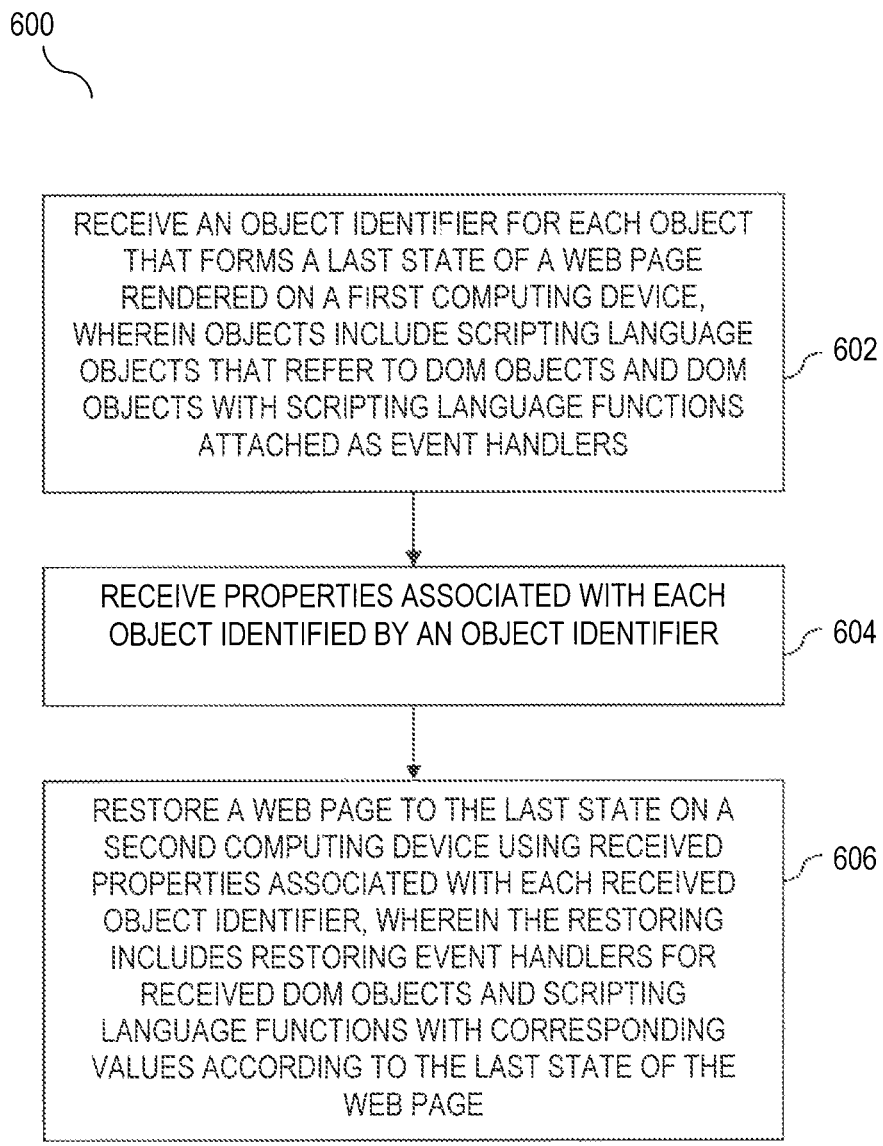
FIG. 6 illustrates another method for web page restoration, according to an embodiment.

FIG. 6 is a flowchart illustrating an example method 600 for web page restoration, according to an embodiment. In this example, a device may receive object identifiers and properties for restoring a web page state. At step 602, an object identifier is received for each object of a plurality of objects that form a last state of a web page rendered on a first computing device. The plurality of objects includes at least one scripting language object that refers to a document object model (DOM) object and at least one DOM object with a scripting language function attached as an event handler.

At step 604, properties associated with each object identified by an object identifier are received. At step 606, a web page is restored to the last state on a second computing device using received properties associated with each received object identifier. The restoring includes restoring event handlers for received DOM objects and scripting language functions with corresponding values according to the last state of the web page. Steps 602 to 606 may be performed by web page restoration system 222.

With this infrastructure, the previously discussed problem scenarios can be supported. For example, whenever a browser restart is required, every open tab has its state persisted to disk. When the browser starts, it checks for such persisted tabs and restores them to active tabs. When the browser decides it wants to purge a tab, it can persist its state to permanent storage (flash, disk, or over the network). When the user switches back to that tab it can restore the state.

In a further example, the browser has a "save and close" button, which is used to save the state of the application to disk and synchronizes it to a server using an account the browser is connected to. For example, this may use the same system the browser uses for synchronizing state information such as bookmarks. The "new tab page" may have a new section for "saved pages." When clicked on, it restores the persisted state.

Other scenarios of web page restoration are provided. A browser history is augmented to include the page state as well as the URL. Whenever a tab is closed, its state is saved in the history (and subject to some reclamation policy to avoid using too much disk space). When clicking on a link in the history, if it has saved state associated with it, it is restored rather than making any network requests for the URL.

In another scenario, a browser has a "share" button which saves the state of the page to a server and provides a URL which can be used in other instances of the same browser (e.g., on other devices) to restore the state. Also, with user consent, a system can be implemented to automatically persist a pages state when there is an error (such as unhandled exception) and send it to a site owner.

If just the DOM state is persisted and the scripting language ignored, this would be good enough for some pages. However, this would cause errors and missing functionality with many other web pages. The embodiments described for web page restoration using stored object identifiers and properties for DOM objects and scripting language objects may provide for more thorough web page restoration. Web page restoration may include forms, applets, and other applications implemented in a web browser or other web application.

Figure 7:
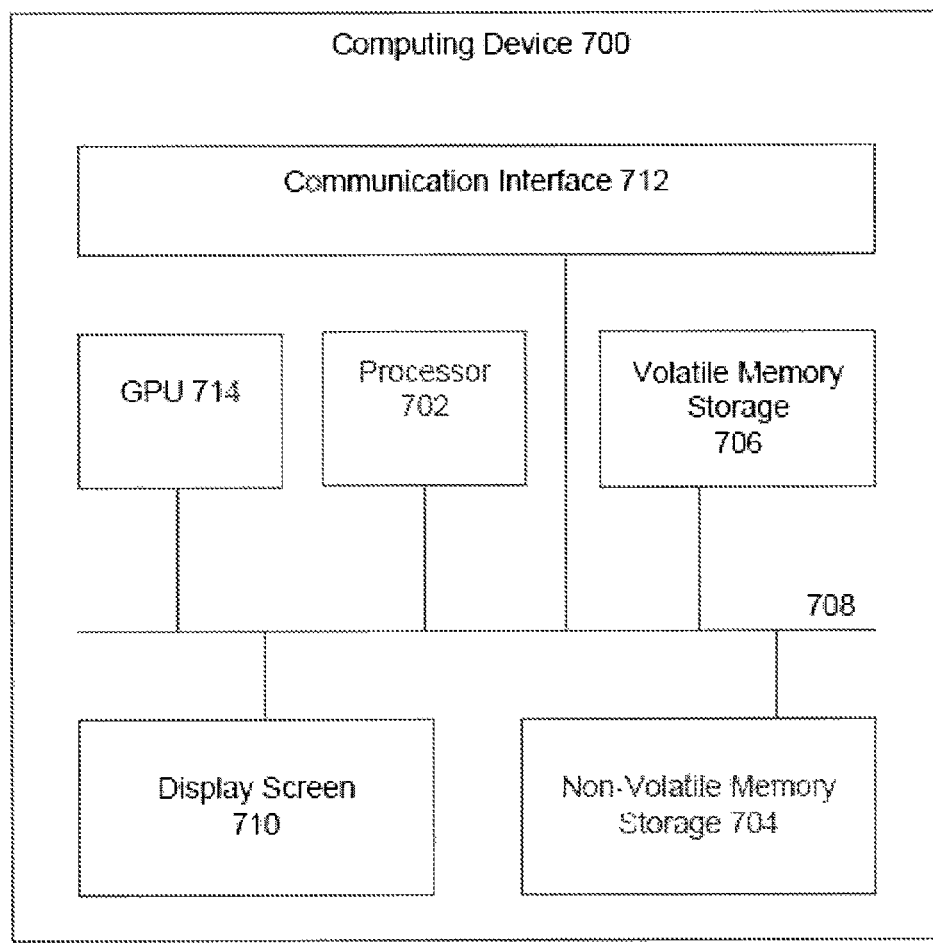
FIG. 7 is a block diagram of a computer system in which embodiments of the invention can be implemented.

FIG. 7 is an example computer system 700 in which embodiments of the present invention, or portions thereof, may be implemented as computer-readable code. For example, the components or modules of web page restoration system 110, such as root node identifier 112, object queue builder 114 and web page restorer 116. etc., may be implemented in one or more computer systems 700 using hardware, software, firmware, tangible computer-readable media having instructions stored thereon, or a combination thereof and may be implemented in one or more computer systems or other processing systems. Modules and components in FIGS. 1-6 may be embodied in hardware, software, or any combination thereof.

Computing devices, such as client devices 210 and 220, may include one or more processors 702, one or more non-volatile storage mediums 704, one or more memory devices 706, a communication infrastructure 708, a display screen 710 and a communication interface 712.

Processors 702 may include any conventional or special purpose processor, including, but not limited to, digital signal processor (DSP), field programmable gate array (FPGA), application specific integrated circuit (ASIC), and multi-core processors.

GPU 714 is a specialized processor that executes instructions and programs, selected for complex graphics and mathematical operations, in parallel.

Non-volatile storage 704 may include one or more of a hard disk drive, flash memory, and like devices that may store computer program instructions and data on computer-readable media. One or more of non-volatile storage device 704 may be a removable storage device.

Memory devices 706 may include one or more volatile memory devices such as but not limited to, random access memory. Communication infrastructure 708 may include one or more device interconnection buses such as Ethernet, Peripheral Component Interconnect (PCI), and the like.

Typically, computer instructions are executed using one or more processors 702 and can be stored in non-volatile storage medium 704 or memory devices 706.

Display screen 710 allows results of the computer operations to be displayed to a user or an application developer.

Communication interface 712 allows software and data to be transferred between computer system 700 and external devices. Communication interface 712 may include a modem, a network interface (such as an Ethernet card), a communications port, a PCMCIA slot and card, or the like. Software and data transferred via communication interface 712 may be in the form of signals, which may be electronic, electromagnetic, optical, or other signals capable of being received by communication interface 712. These signals may be provided to communication interface 712 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for restoring web pages, comprising:
    identifying a root node of a node graph based on a scripting language object list that remains after garbage collection of a scripting language heap of a web page, wherein each node of the node graph represents an object of a plurality of objects that form a last state of the web page and the plurality of objects includes at least one scripting language object that refers to a document object model (DOM) object;
    traversing the node graph to a next frontier node;
    determining an object identifier of the next frontier node; and
    storing the object identifier and object properties associated with the object identified by the object identifier into a queue of objects when the object identifier of the next frontier node is not found in the queue of objects, whereby the queue of objects is used to restore objects with object properties having values according to the last state of the web page.

2. The method of claim 1, further comprising:
storing transient rendering-related visual properties to DOM elements as temporary attributes.

3. The method of claim 2, wherein storing transient properties further comprises storing the temporary attributes as expando properties.

4. The method of claim 2, further comprising:
storing most recently issued commands sufficient to generate visible contents of an immediate drawing mode tag.

5. The method of claim 1, further comprising:
restoring a web page to the last state using stored properties associated with each stored object identifier.

6. The method of claim 5, wherein restoring further comprises restoring event handlers for stored DOM objects with corresponding values according to the last state of the web page.

7. The method of claim 5, wherein restoring further comprises rendering objects and associated properties of the restored web page by processing the object identifier queue.

8. The method of claim 5, wherein the restoring further comprises requesting the stored object identifiers and stored associate properties from a first device and rendering the restored web page in a browser on the second device.

9. The method of claim 1, wherein storing includes serializing the object identifiers and associated properties into the queue of objects according to a first object graph.

10. The method of claim 9, further comprising:
deserializing the object identifiers and associated properties from the queue of objects into a second object graph similar to the first object graph.

11. The method of claim 1, wherein each event handler of a DOM object is stored with an event name and references to each closure object.

12. The method of claim 1, wherein the at least one DOM object has a scripting language function attached as an event handler.

13. The method of claim 12, further comprising: restoring event handlers for stored scripting language functions with corresponding values according to the last state of the web page.

14. The method of claim 1, further comprising:
sending the stored object identifiers and stored associated properties to a server, whereby the last state of the web page may be restored in a browser on another device.

15. The method of claim 1, wherein the plurality of objects includes at least one scripting language closure that references a function and a list of name-value pairs for an environment of the function.

16. The method of claim 1, wherein associated properties of an object include properties of at least one scripting language function written in binary form or byte-code form.

17. The method of claim 1, wherein the plurality of objects includes at least one of encoded primitive values, objects of a scripting language heap for the web page, or code of a scripting language stack for the web page and the associated properties include local variables available to the code.

18. The method of claim 1, wherein the object identifier of each object is its address in memory.

19. The method of claim 1, wherein storing an object identifier for each object includes generating a unique identifier for each object.

20. The computer-implemented method of claim 1, further comprising waiting a period of time for an active script language event handler to complete before traversing the node graph.

21. A system for restoring web pages, comprising:
a root node identifier, implemented on a computing device and configured to:
identify a root node of a node graph based on a scripting language object list remaining after garbage collection of a scripting language heap of a web page, wherein each node of the node graph represents an object of a plurality of objects that form a last state of the web page, wherein the plurality of objects includes at least one scripting language object that refers to a document object model (DOM) object;
traverse the node graph to a next frontier node;
determine an object identifier of the next frontier node; and
an object queue builder, implemented on the computing device and configured to store the object identifier and object properties associated with the object identified by the object identifier into a queue of objects when the object identifier of the next frontier node is not found in the queue of objects, whereby the queue of objects is used to restore objects with object properties having values according to the last state of the web page.

22. The system of claim 21, wherein the object queue builder is further configured to store transient rendering-related visual properties to DOM elements as temporary attributes.

23. The system of claim 22, wherein the object queue builder is further configured to store the temporary attributes as expando properties.

24. The system of claim 21, wherein the object queue builder is further configured to store most recently issued commands sufficient to generate visible contents of an immediate drawing mode tag.

25. The system of claim 21, further comprising a web page restorer configured to restore a web page to the last state using stored properties associated with each stored object identifier.

26. The system of claim 25, wherein the web page restorer is further configured to restore event handlers for stored DOM objects with corresponding values according to the last state of the web page.

27. The system of claim 21, wherein the at least one DOM object has a scripting language function attached as an event handler.

28. The system of claim 21, further comprising a web page restorer configured to restore event handlers for stored scripting language functions with corresponding values according to the last state of the web page.

29. The system of claim 21, wherein the root node identifier is further configured to, implemented on a computing device and configured to wait a period of time for an active script language event handler to complete before traversing the node graph.

30. A system for restoring web pages, comprising:
an object identifier receiver, implemented on a computing device and configured to receive an object identifier for each object of a plurality of objects that form a last state of a web page rendered on a first computing device, wherein the plurality of objects includes at least one scripting language object that refers to a document object model (DOM) object and at least one DOM object with a scripting language function attached as an event handler;
an associated properties receiver, implemented on the computing device and configured to receive expando properties associated with temporary attributes of the at least one scripting language object identified by an object identifier; and a web page restorer, implemented by a second computing device, configured to restore a web page to the last state using the received properties associated with each received object identifier, including restoring event handlers for received DOM objects and scripting language functions with corresponding expando properties according to the last state of the web page.

\* \* \* \* \*